United States Patent
Beever et al.

(10) Patent No.: US 10,207,688 B2
(45) Date of Patent: Feb. 19, 2019

(54) BRAKE CONTROL

(71) Applicant: Jaguar Land Rover Limited, Whitley, Coventry, Warwickshire (GB)

(72) Inventors: Paul Beever, Warwickshire (GB); Timothy Reynolds, Warwickshire (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/457,932

(22) Filed: Mar. 13, 2017

(65) Prior Publication Data

US 2017/0182987 A1   Jun. 29, 2017

Related U.S. Application Data

(63) Continuation of application No. 13/825,320, filed as application No. PCT/EP2011/066192 on Sep. 19, 2011, now Pat. No. 9,592,804.

(30) Foreign Application Priority Data

Sep. 20, 2010   (GB) .................................. 1015728.7

(51) Int. Cl.
*B60T 8/32* (2006.01)
*B60T 7/12* (2006.01)
(Continued)

(52) U.S. Cl.
CPC ............ *B60T 8/3205* (2013.01); *B60K 31/00* (2013.01); *B60T 7/12* (2013.01); *B60T 8/245* (2013.01);
(Continued)

(58) Field of Classification Search
CPC ..... B60T 7/12; B60T 8/00; B60T 8/17; B60T 8/32; B60T 8/3205; B60T 8/3255;
(Continued)

(56) References Cited

U.S. PATENT DOCUMENTS 4,231,257 A * 11/1980 Yoshino .................. G01C 9/00
33/775
4,962,835 A    10/1990 Press
(Continued)

FOREIGN PATENT DOCUMENTS

DE    19545010 A1    6/1997
DE    10014963 A1    9/2001
(Continued)

OTHER PUBLICATIONS

International Search Report for International application No. PCT/EP2011/066192, dated Dec. 19, 2011, 4 pages.
(Continued)

*Primary Examiner* — Thomas G Black
*Assistant Examiner* — Sara J Lewandroski
(74) *Attorney, Agent, or Firm* — Reising Ethington P.C.

(57) ABSTRACT

A brake control system for a motor vehicle having a plurality of wheels, brakes for applying a braking effort to one or more of the wheels, and a movement sensor for detecting movement of the vehicle. The system comprises a brake actuator for actuating the brakes to supply a braking effort and a brake controller for controlling the brake actuator. The brake controller is configured to determine an acceleration of the vehicle based on movement detected by the movement sensor and to ensure that the brake actuator supplies a braking effort if the determined acceleration exceeds a set acceleration limit.

10 Claims, 2 Drawing Sheets

(51) Int. Cl.
  *B60T 8/24* (2006.01)
  *B60K 31/00* (2006.01)
  *B60T 8/52* (2006.01)
  *B60W 30/14* (2006.01)

(52) U.S. Cl.
  CPC ............ *B60T 8/52* (2013.01); *B60T 2201/04* (2013.01); *B60W 30/146* (2013.01); *B60W 2720/106* (2013.01)

(58) Field of Classification Search
  CPC . B60T 8/3275; B60T 8/52; B60T 8/58; B60T 8/74; B60T 8/24; B60T 8/245; B60T 2201/04
  See application file for complete search history.

(56) References Cited

U.S. PATENT DOCUMENTS

| | | | |
|---|---|---|---|
| 5,941,614 A * | 8/1999 | Gallery | B60K 31/00 180/170 |
| 6,033,041 A | 3/2000 | Koga et al. | |
| 6,070,682 A | 6/2000 | Isogai et al. | |
| 6,079,801 A * | 6/2000 | Zittlau | B60T 7/042 188/158 |
| 6,098,002 A | 8/2000 | Horiguchi et al. | |
| 6,158,824 A * | 12/2000 | Yonemura | B60T 7/12 303/113.4 |
| 6,236,915 B1 | 5/2001 | Furukawa et al. | |
| 6,243,640 B1 * | 6/2001 | Beever | B60K 31/107 123/352 |
| 6,283,240 B1 | 9/2001 | Beever | |
| 6,339,740 B1 | 1/2002 | Seto et al. | |
| 6,363,306 B1 | 3/2002 | Palmertz et al. | |
| 6,792,344 B2 | 9/2004 | Minowa et al. | |
| 6,913,326 B1 * | 7/2005 | Ohkubo | B60T 7/122 303/11 |
| 7,469,179 B2 | 12/2008 | Thissen et al. | |
| 8,352,119 B2 | 1/2013 | Arai et al. | |
| 9,592,804 B2 | 3/2017 | Beever | |
| 2002/0000122 A1 * | 1/2002 | Reuter | B60K 31/0008 73/488 |
| 2002/0096003 A1 | 7/2002 | Yamada et al. | |
| 2004/0211609 A1 | 10/2004 | Schmitt | |
| 2004/0249535 A1 | 12/2004 | Maass et al. | |
| 2005/0065704 A1 * | 3/2005 | Glora | B60K 31/04 701/93 |
| 2005/0096183 A1 * | 5/2005 | Watanabe | B60K 31/04 477/182 |
| 2005/0256627 A1 | 11/2005 | Sah et al. | |
| 2006/0212205 A1 | 9/2006 | Yang et al. | |
| 2007/0270281 A1 | 11/2007 | Inoue et al. | |
| 2009/0048751 A1 | 2/2009 | Nakai et al. | |
| 2009/0118958 A1 | 5/2009 | Abe | |
| 2009/0127012 A1 | 5/2009 | Leibbrandt et al. | |
| 2009/0299557 A1 | 12/2009 | Farnsworth | |
| 2009/0322264 A1 | 12/2009 | Imura | |
| 2010/0009807 A1 | 1/2010 | Umakoshi et al. | |
| 2010/0088001 A1 | 4/2010 | Kato | |
| 2010/0121550 A1 | 5/2010 | Inoue et al. | |
| 2010/0191436 A1 | 7/2010 | Hellmann et al. | |
| 2010/0250083 A1 | 9/2010 | Takahashi et al. | |
| 2010/0292904 A1 | 11/2010 | Taguchi et al. | |
| 2011/0046829 A1 | 2/2011 | Tamai et al. | |
| 2011/0307154 A1 | 12/2011 | Takeda et al. | |
| 2012/0029781 A1 | 2/2012 | Dickenson et al. | |
| 2012/0043145 A1 | 2/2012 | Gecim et al. | |
| 2014/0163832 A1 | 6/2014 | Beever et al. | |

FOREIGN PATENT DOCUMENTS

| | | |
|---|---|---|
| EP | 0784551 B1 | 3/1999 |
| EP | 0983894 A2 | 3/2000 |
| EP | 1375278 A2 | 6/2003 |
| EP | 1538042 A1 | 6/2005 |
| EP | 1777133 A1 | 4/2007 |
| JP | H10507145 A | 7/1998 |
| JP | 2002264784 A | 9/2002 |
| JP | 2004142690 A | 5/2004 |
| JP | 2006111034 A | 4/2006 |
| JP | 2009061946 A | 3/2009 |
| JP | 2010023565 A | 2/2010 |
| WO | WO2004067342 A1 | 8/2004 |

OTHER PUBLICATIONS

Written Opinion for International application No. PCT/EP2011/066192, dated Dec. 19, 2011, 3 pages.

* cited by examiner

BRAKE CONTROL

TECHNICAL FIELD

The present invention relates to a brake control system for a motor vehicle. In particular, though not exclusively, it relates to a brake control system for facilitating the control of a motor vehicle on a slope. Aspects of the invention relate to a system, to a method and to a vehicle.

BACKGROUND

There are a number of existing brake control systems for facilitating the control of motor vehicles on slopes.

EP 0 784 551 B1 discloses a brake control system comprising a hill descent mode in particular for vehicles used in off-road conditions. The brake control system comprises an electronic control unit and a brake control system to control brakes associated with each wheel of the vehicle. A driver interface in the form of a switch is used to cause the control unit to enter a hill descent mode when the vehicle is also detected to be in gear. In this mode the control unit controls the speed of the vehicle by braking to slow the vehicle when a detected vehicle speed is above a preset target speed.

When driving a motor vehicle off road it might be necessary to come to a standstill on a slope. In this context, EP 1 777 133 A1 discloses a brake control system in which a brake control means is arranged to detect when the vehicle is stationary and is held on a slope by a braking effort supplied by brakes in accordance with the operation of a brake command means (such as a brake pedal). The release of the braking effort is controlled as a function of the steepness of the slope following operation of the brake command means to release the brakes.

Whilst the brake control system of EP 1 777 133 A1 helps to smooth transition from a stationary position to hill descent to a degree, it does not exercise control over the vehicle once it is in hill descent. The system of EP 1 777 133 A1 may of course be used in conjunction with the system of EP 0 784 551 B1, but this can still lead to jerky (and therefore, to a degree, uncontrolled) hill descent in some circumstances, for example if the vehicle gathers speed following the release of the brakes by the system of EP 1 777 133 A1 and then has to be braked heavily when the target speed of the system of EP 0 784 551 B1 is exceeded.

It is an aim of this invention to provide an improved brake control system that overcomes or minimizes the above problem. Other aims and advantages of the invention will become apparent from the following description, claims and drawings.

SUMMARY OF THE INVENTION

Aspects of the invention therefore provide a system, a method and a vehicle as claimed in the appended claims.

According to another aspect of the invention for which protection is sought, there is provided a brake control system for a motor vehicle having a plurality of wheels, brakes for applying a braking effort to one or more of the wheels, and movement sensing means for detecting movement of the vehicle, the system comprising: brake actuation means for actuating the brakes to supply a braking effort; and brake control means for controlling the brake actuation means, wherein the brake control means is arranged to determine an acceleration of the vehicle based on movement detected by the movement sensing means and to ensure that the brake actuation means supplies a braking effort if the determined acceleration exceeds a set acceleration limit.

By ensuring that the brake actuation means supplies a braking effort when the acceleration of the vehicle exceeds a set acceleration limit, the system of the invention enables smooth hill descent throughout, thus enhancing control over the vehicle.

Advantageously, the brake control means may be arranged to determine the acceleration of the vehicle based on movement of the vehicle detected during a time cycle, preferably of 100 milliseconds or less. Of course the acceleration of the vehicle may conveniently be determined continuously whilst the system is activated, for example based on a plurality of time cycles each preferably of 100 milliseconds or less, more preferably 50 milliseconds or less, most preferably 20 milliseconds or less. Shorter time cycles lead to more accurate and immediate determination of acceleration and hence a more accurate and immediate braking response, which in turn ensures even smoother hill descent and even better control over the vehicle.

It will be appreciated that the determination of the acceleration of the vehicle may occur within the movement sensing means itself. Thus the brake control system, and in particular the brake control means, may function integrally with and/or include the movement sensing means. More generally the brake control means may comprise a single electronic control unit or one or more control units.

The brake control means may be configured (or arranged) to set the acceleration limit as a fixed value, e.g. a value below 1 $ms^{-2}$. The fixed acceleration limit may be based on a user input, e.g. via an interface. Alternatively, and more preferably, the brake control means may be arranged to set the acceleration limit dynamically based on one or more vehicle conditions or driver inputs.

In an embodiment, the brake control means may be arranged to measure a desired drive torque and to set the acceleration limit dynamically based on the desired drive torque. The brake control means may measure the desired drive torque form the signal of an accelerator pedal position sensor of the vehicle, optionally further taking into account a signal from a gear selection sensor. An accelerator pedal position sensor and/or a gear selection sensor may thus function integrally with and/or form part of the brake control system.

Setting the acceleration limit dynamically based on a desired drive torque enables particularly smooth hill descent of the vehicle since it ensures that the acceleration of the vehicle conforms with the intention of the driver. In this regard it is advantageous that the brake control means be configured to increase the set acceleration limit with increasing desired torque.

Determining the desired drive torque based on the signal of the gear selection sensor may involve multiplying the signal of the accelerator pedal position sensor by a factor associated with a selected gear. Advantageously, the brake control means may be arranged to set the acceleration limit independently of the signal of the accelerator pedal position sensor if no gear is selected (i.e. the vehicle is in neutral).

For maximum conformity with driver intentions, the brake control means may be arranged to determine a desired acceleration associated with the desired drive torque and to set the acceleration limit at a threshold equal to or above the desired acceleration. The desired acceleration may conveniently correspond to an estimate of the acceleration that would result from the desired drive torque in a zero gradient state of the vehicle (i.e. on level ground). Advantageously, the brake control means may be arranged to set the acceleration limit at a value in the range of from 0 to 1 ms$^{-2}$ above the desired acceleration.

The brake control means may also be arranged to set the acceleration limit in dependence on the gradient of the vehicle. The gradient of the vehicle may be detected by a gradient sensing means of the vehicle, such as an inclinometer, which may function integrally with and/or form part of the brake control system. The brake control means may be arranged to lower the acceleration limit in response to an increased gradient of the vehicle.

Advantageously, the direction of travel of the vehicle may be monitored by the brake control means (by communication with the movement sensing means). The brake control means may advantageously be arranged to determine whether the vehicle is travelling in an intended direction or an unintended direction with reference to a selected gear. Advantageously, the brake control means may be arranged to set the acceleration limit in dependence on the direction of travel, with the acceleration limit optionally being set lower when the vehicle is moving in an unintended direction than when the vehicle is moving in an intended direction The brake control system may optionally have activated and deactivated states, which may be selectable via a user interface. The brake control means may deactivate the system either conventionally, by placing the system in standby, or, conveniently, by setting the acceleration limit to a high level that cannot be achieved by the vehicle.

The system may comprise a driver brake pedal and a brake pedal position sensor in communication with the brake control means. In some cases driver input will obviate the need for additional braking effort in which case the brake control means simply monitors the braking effort. Thus the brake control means may preferably only add to the supply of braking effort when the relevant braking effort is not already being provided by input from a driver, e.g. though a brake pedal. In the present invention braking effort may advantageously be supplied as needed to supplement driver input. Braking effort may be supplied to all wheels of the vehicle to maximize traction.

The brake control system may be integral or function in conjunction with other brake control systems, for example such as those described in EP 0 784 551 B1 and/or EP 1 777 133 A1.

According to a further aspect of the invention for which protection is sought, there is provided a method for controlling the brakes of a motor vehicle, the method comprising: measuring a desired drive torque, setting an acceleration limit of the vehicle based on the desired drive torque, determining an acceleration of the vehicle and, if the determined acceleration exceeds the set acceleration limit, ensuring that the brakes supply a braking effort.

According to a still further aspect of the invention for which protection is sought, there is provided a motor vehicle comprising a brake control system according to one aspect of the invention or adapted to use a method according to another aspect of the invention.

Within the scope of this application it is envisaged that the various aspects, embodiments, examples, features and alternatives set out in the preceding paragraphs, in the claims and/or in the following description and drawings may be taken independently or in any combination. Features and advantages recited in respect of the one aspect of the invention apply mutatis mutandis to any other aspect of the invention, except where there is incompatibility of features.

BRIEF DESCRIPTION OF THE DRAWINGS

The invention will now be described by way of example with reference to the accompanying drawings of which.

DETAILED DESCRIPTION

Figure 1:
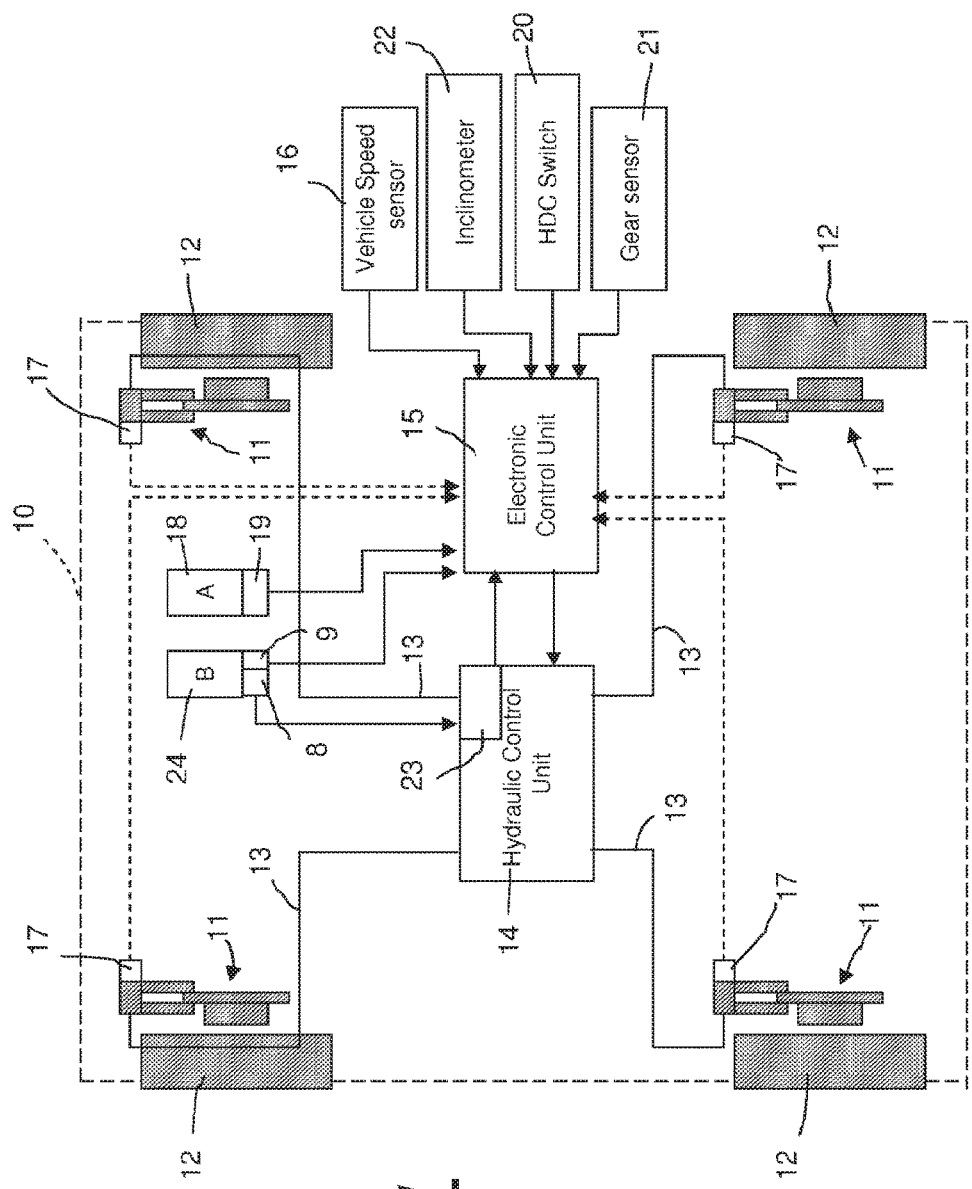
FIG. 1 is a schematic drawing of a brake control system for a motor vehicle embodying one form of the present invention.

Referring to FIG. 1, there is shown a motor vehicle 10 in a dashed outline with a brake control system having a hill descent mode, according to a first embodiment of the invention.

When the hill descent mode is activated, the brake control system is in an activated state for the purpose of the invention. By contrast, when the hill descent mode is deactivated, the brake control system is deactivated for the purpose of the invention.

The brake control system, and in particular the hill descent mode, may additionally perform other brake functions not related to the invention, such those described in EP 0 784 551 B1 or EP 1 777 133 A1.

The brake control system includes in a conventional manner a braking arrangement with a disc brake 11 on each of four wheels 12. Each disc brake 11 is hydraulically operated through a hydraulic line 13 by a brake hydraulic control (HC) unit 14 which functions as a brake actuation means. The HC unit 14 is controlled by an electronic control (EC) unit 15, which functions as a brake control means. FIG. 1 is only a diagram of the most important functional components of the brake control system in accordance with the invention. Further details of the brake control system are described in EP 0 784 551 B1 and are included in the description by reference and thus will not be further described.

The EC unit 15 receives a vehicle speed signal from movement sensing means in the form of a vehicle speed sensor 16, an individual wheel speed signal from a wheel speed sensor 17 on each wheel 12 and a driver demand signal from an accelerator (or throttle) pedal 18, which incorporates an accelerator pedal position sensor 19. The EC unit 15 also receives a hill descent signal from a driver hill control switch 20, a gear signal from a drive gear sensor 21 and an inclination angle signal from a gradient sensing means, in this example an inclinometer 22. The EC unit 15 receives a pedal braking signal from a brake light switch 9 on a brake pedal 24.

The brake pedal 24 is also associated with a master cylinder 8, which is connected to a brake pressure sensor 23 forming part of the HC unit 14. The brake pressure sensor 23 is arranged to send a driver braking signal from the brake pressure sensor 23 to the EC unit 15.

The EC unit 15 is active to control the HC unit 14 whenever the hill control switch 20 is switched on by the driver to select hill descent mode. The EC unit can operate in conjunction with (i.e. to supplement) operator inputs from the brake and accelerator pedals 24, 18.

When driving the motor vehicle 10 it may be desired to descend a slope. To assist drivers with descending slopes in a controlled manner, the EC unit 15 is configured (arranged), in the activated state of the system, to ensure that the brake actuation means supplies a braking effort when the movement sensing means determines that the acceleration of the vehicle exceeds a set acceleration limit.

In a first operational mode of the system, the acceleration limit is set at a fixed value of 0.5 ms$^{-2}$. The EC unit 15 monitors the movement of the vehicle, as detected by the vehicle speed sensor 16 and determines the acceleration of the vehicle in cycles of 10 milliseconds. If the acceleration is found to exceed the acceleration limit of 0.5 ms$^{-2}$ then the EC unit 15 checks the signal from the brake pressure sensor 23, which is also continuously monitored by the EC unit 15, to determine if a suitable braking effort is already being applied by the driver via the brake pedal 24. In the event that insufficient (if any) braking effort is being applied via the brake pedal, the EC unit 15 issues a command to the HC unit 14 to apply and maintain a braking effort to bring the acceleration of the vehicle within the limit of 0.5 ms$^{-2}$.

Figure 2:
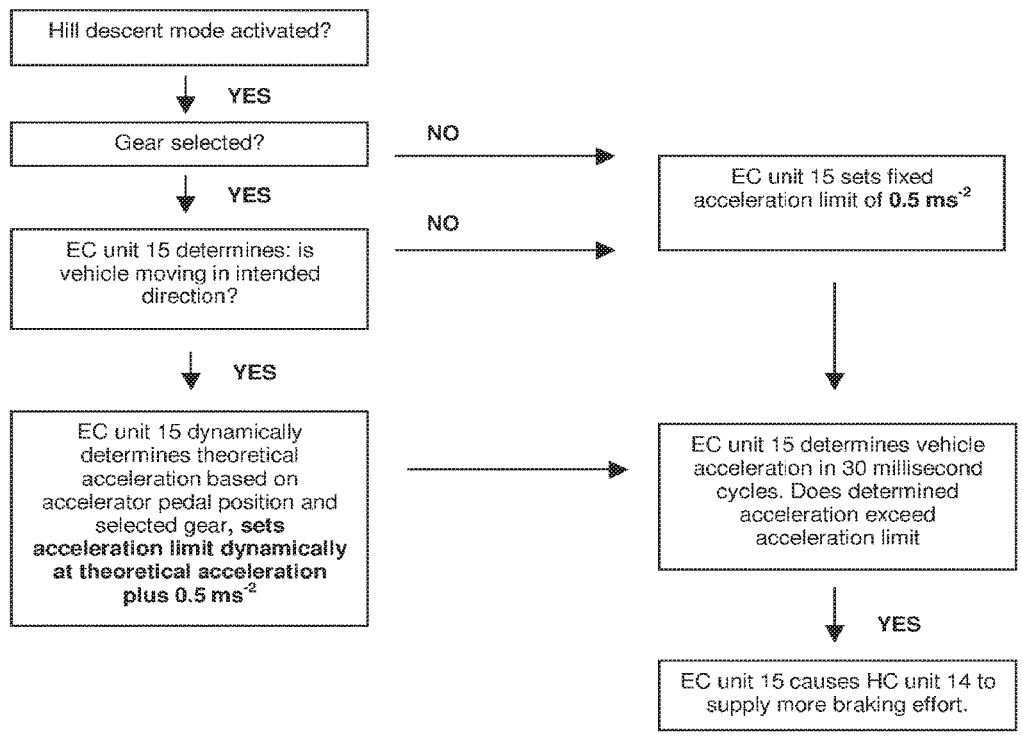
FIG. 2 is a flowchart summarizing the working of the brake control system of FIG. 1 in an operational mode.

A second operational mode of the system will now be described with reference to FIG. 2. In this mode the acceleration limit is set at a fixed value of 0.5 ms$^{-2}$ only if the vehicle is not in gear or is travelling in an unintended direction. If on the other hand the vehicle is travelling in an intended direction associated with a selected gear, the acceleration limit is set dynamically based on a desired drive torque.

In the second operational mode, once the hill descent mode is activated, the EC unit 15 checks, via the gear sensor 21 whether a gear is selected. If no gear is selected, or if the EC unit determines through the vehicle speed sensor 16 that the vehicle is travelling in an unintended direction (based on a selected gear), the EC unit 15 sets a fixed acceleration limit of 0.5 ms$^{-2}$.

However, if at any stage the EC unit 15 is notified by the gear sensor 21 that a gear is selected and the vehicle is moving in the intended direction of travel associated with the selected gear, the EC unit proceeds to set the acceleration limit dynamically based on a desired drive torque indicated by the accelerator pedal position sensor 19.

Specifically, the EC unit dynamically determines (or looks up in a table or map) a desired acceleration associated with the accelerator pedal position and the selected gear. The desired acceleration corresponds to an estimation of the acceleration that would be expected if the vehicle were in a zero gradient state, i.e. on level ground, and is thus based on known information about the vehicle such as weight and drag.

The desired acceleration, which is determined in cycles of 10 milliseconds, serves as the basis for setting the acceleration limit: the acceleration limit is set at 0.5 ms$^{-2}$ above the desired acceleration. In a variant of the second operational mode (not shown in FIG. 2), the EC unit 15 checks the signal from the inclinometer 22, adjusts the acceleration limit to be equal to the desired acceleration if the vehicle is detected to be on a gradient greater than 20%.

Once the acceleration limit has been set, either as a fixed value (when no gear is selected or the vehicle is moving in an unintended direction) or as a dynamic value (when the vehicle is moving in an intended direction, the EC unit 15 proceeds to monitor the movement of the vehicle, as detected by the vehicle speed sensor 16, and determines the acceleration of the vehicle continuously, in cycles of 10 milliseconds. If the acceleration is found to exceed the acceleration limit then the EC unit 15 checks the signal from the brake pressure sensor 23, which is also continuously monitored by the EC unit 15, to determine if a suitable braking effort is already being applied by the driver via the brake pedal 24. In the event that insufficient (if any) braking effort is being applied via the brake pedal, the EC unit 15 issues a command to the HC unit 14 to apply and maintain a braking effort to bring the acceleration of the vehicle within the limit.

The following operational examples are provided to illustrate the second mode of operation of the brake control system according to the first embodiment of the invention:

The vehicle 10 is driven down a steep slope in a downhill gear. Vehicle acceleration exceeds desired acceleration plus 0.5 mu$^{-2}$. The EC unit 15 sends a command to the HC unit 14 to generate a braking effort and limits the vehicle acceleration to desired acceleration plus 0.5 mu$^{-2}$.

The vehicle 10 is driven down a steep slope in a downhill gear. The driver changes gear and the new gear results in a vehicle acceleration. The acceleration exceeds desired acceleration plus 0.5 mu$^{-2}$. The EC unit 15 sends a command to the HC unit 14 to generate a braking effort and limits the vehicle acceleration to desired acceleration plus 0.5 mu$^{-2}$.

It is possible to modify the second operational mode such that the acceleration limit associated with movement an unintended direction is set based on desired torque, as described in respect of movement in an intended direction.

More generally, it will be appreciated that a number of modifications can be made to the brake control system of the first embodiment without departing from the scope of the invention. For example, it is not necessary for the activation of the brake control system to be dependent on the activation of a hill descent mode. Thus, the brake control system of the first embodiment can, according to a second embodiment of the invention, be modified to remain active whenever the vehicle is operated.

The invention claimed is:

1. A brake control system for a motor vehicle having a plurality of wheels, brakes for applying a braking effort to one or more of the wheels, and movement sensing means for detecting movement of the vehicle, the system comprising:
   brake actuation means for actuating the brakes to supply a braking effort; and
   brake control means for controlling the brake actuation means, wherein the brake control means is configured to determine an acceleration of the vehicle based on movement detected by the movement sensing means and to ensure that the brake actuation means supplies a braking effort if the determined acceleration exceeds a set acceleration limit;
   a user operable accelerator pedal;
   wherein the system determines a desired drive torque in dependence on an instantaneous accelerator pedal position relating to a user operation of said accelerator pedal; and
   wherein the brake control means of the system is configured to set the acceleration limit dynamically based on the determined desired drive torque and in dependence on a gradient of the vehicle, to lower said set acceleration limit in response to an increased gradient of the vehicle, and to increase the set acceleration limit with increasing determined desired drive torque.

2. The brake control system of claim 1, wherein the brake control means is configured to set the acceleration limit dynamically based on one or both of one or more vehicle conditions and driver input.

3. The brake control system of claim 1, wherein the control means is configured to set the acceleration limit independently of the signal of an accelerator pedal position sensor of the vehicle if the vehicle is in neutral.

4. The brake control system of claim 1, wherein the brake control means is configured to determine a desired acceleration associated with the desired drive torque and to set the acceleration limit at a threshold equal to or above the desired acceleration.

5. The brake control system of claim 1, further comprising gradient sensing means and wherein the gradient of the vehicle is detected by said gradient sensing means.

6. A motor vehicle comprising a plurality of wheels, brakes for applying a braking effort to one or more of the wheels, movement sensing means for detecting movement of the vehicle, and a brake control system the comprises:
   brake actuation means for actuating the brakes to supply a braking effort; and
   brake control means for controlling the brake actuation means, wherein the brake control means is configured to determine an acceleration of the vehicle based on movement detected by the movement sensing means and to ensure that the brake actuation means supplies a braking effort if the determined acceleration exceeds a set acceleration limit;
   a user operable accelerator pedal;
   wherein the system determines a desired drive torque in dependence on an instantaneous accelerator pedal position relating to a user operation of said accelerator pedal; and
   wherein the brake control means of the system is configured to set the acceleration limit dynamically based on the determined desired drive torque and in dependence on a gradient of the vehicle, to lower said set acceleration limit in response to an increased gradient of the vehicle, and to increase the set acceleration limit with increasing determined desired drive torque.

7. A method of operating a brake control system for a motor vehicle having a plurality of wheels and brakes for applying a braking effort to one or more of the wheels, the method comprising:
   detecting movement of the vehicle using at least one sensor;
   determining an acceleration of the vehicle based on the detected movement;
   determining a desired drive torque in dependence on an instantaneous accelerator pedal position relating to a user operation of an accelerator pedal in the vehicle;
   setting an acceleration limit dynamically based on the determined desired drive torque and in dependence on a gradient of the vehicle;
   increasing the set acceleration limit when the determined desired drive torque increases;
   lowering the acceleration limit in response to detecting an increased gradient of the vehicle; and
   applying the brakes if the determined acceleration exceeds the set acceleration limit.

8. The method set forth in claim 7, wherein the step of determining a desired drive torque further comprises determining a desired acceleration associated with the desired drive torque, and wherein the step of setting the acceleration limit further comprises setting the acceleration limit at a threshold equal to or above the desired acceleration.

9. The method set forth in claim 7, wherein the step of setting the acceleration limit further comprises setting the acceleration limit dynamically based on the determined desired drive torque when a vehicle gear is selected, and wherein the method further comprises the step of setting the acceleration limit independently of the accelerator pedal position when the vehicle is in neutral.

10. The method set forth in claim 7, wherein the step of setting the acceleration limit further comprises setting the acceleration limit dynamically based on one or both of one or more vehicle conditions and driver input.

* * * * *